United States Patent Office 3,502,739
Patented Mar. 24, 1970

3,502,739
PROCESS FOR DEHYDROGENATING PARAFFINS TO THE CORRESPONDING DIOLEFINS
John W. Begley and Harold J. Hepp, Bartlesville, Okla., assignors to Phillips Petroleum Company, a corporation of Delaware
No Drawing. Filed June 23, 1967, Ser. No. 648,227
Int. Cl. C07c 5/18
U.S. Cl. 260—680                                    7 Claims

ABSTRACT OF THE DISCLOSURE

Steam-diluted paraffin hydrocarbons are catalytically dehydrogenated to the corresponding diolefins in alternate steps of paraffin dehydrogenation and hydrogen oxidation until essentially quantitative conversion to olefin has been effected, followed by essentially quantitative oxidative dehydrogenation of the olefin to the diolefin.

---

This invention relates to an improved process for the dehydrogenation of paraffins to the corresponding diolefins.

It is conventional in the art to dehydrogenate paraffins to diolefins in two steps with no intermediate separation of products and unreacted paraffin and to recycle the unconverted paraffins and mono-olefins from the terminal separation step to the primary dehydrogenation step. This type of process is disclosed in U.S. Patent 2,830,042, for example. Steam dilution of the paraffin in the first dehydrogenation step could not be practiced in the process of said patent because the art was not aware of any catalyst having high activity for paraffin dehydrogenation in the presence of steam. Consequently, steam addition between the two dehydrogenation steps was resorted to. In the prior art process just discussed, the use of a single paraffin dehydrogenation step followed by an olefin dehydrogenation step has the disadvantage that equilibrium conversion to the olefins is relatively low at practical operating temperatures and pressures so that considerable paraffin recycle is required from the terminal separation step.

This invention is concerned with an improvement in the above described process which effects substantially higher yield of diolefins.

Accordingly, it is an object of the invention to provide an improved process for the stepwise dehydrogenation of paraffins to the corresponding diolefins. Another object is to provide a paraffin dehydrogenation process which effects substantially higher yields of diolefins than prior art processes. Other objects of the invention will become apparent to one skilled in the art upon consideration of the accompanying disclosure.

Broadly, the invention comprises catalytically dehydrogenating a selected paraffin hydrocarbon in admixture with steam utilizing a catalyst having high activity for paraffin dehydrogenation in the presence of steam, passing the resulting effluent to an oxidation zone in contact with an oxidation catalyst to oxidize the free hydrogen in the effluent, passing the effluent from the oxidation zone to a second paraffin dehydrogenation step to dehydrogenate paraffins substantially as in the first dehydrogenation step, passing the effluent from the second dehydrogenation step to a second hydrogen oxidation step to oxidize the hydrogen released in the second dehydrogenation step, passing the effluent from the second oxidation step to a third paraffin dehydrogenation step, and passing the effluent from the third dehydrogenation step—admixed with oxygen—to an oxidative dehydrogenation step to dehydrogenate the monoolefins to diolefins while simultaneously oxidizing the hydrogen released in this step and in the prior paraffin dehydrogenation step. The paraffin dehydrogenation and hydrogen oxidation step may be repeated as many times as necessary to convert substantially all of the paraffin to olefins, but, usually, one to three repetitions of each step is sufficient.

The feed to the process is any $C_3$ to $C_7$ hydrocarbon, capable of forming a diolefin by dehydrogenation. Preferred feeds are n-butane, n-pentane, and isopentane, which form 1,3-butadiene, 1,3-pentadiene, and isoprene, respectively, on dehydrogenation. Preferably, the paraffin dehydrogenation and hydrogen oxidation steps are repeated until the paraffin content of the feed to the last oxidative dehydrogenation step is equal to or less than 5 mole percent.

The catalyst and operating conditions for the paraffin dehydrogenation steps are set forth in the copending application of Harold J. Hepp and E. O. Box, Jr., S.N. 615,078, filed Feb. 10, 1967, and now abandoned. Catalysts for the paraffin dehydrogenation in admixture with substantial amounts of steam are certain group VIII metal or metal compounds capable of reduction, including nickel, platinum, ruthenium, palladium, iridium, rhodium, osmium, and mixtures thereof, with a base or support selected from the group consisting of alumina, HF-treated alumina, silica, magnesia, zirconia, aluminum silicates, Group II aluminate spinels, and mixtures thereof, including mixtures of spinel and excess Group II metal oxide or spinel and excess alumina, having incorporated therein at least one alkali or alkaline earth metal compound, such as sodium hydroxide, potassium carbonate, lithium hydroxide, barium acetate, barium hydroxide, calcium oxide, and the like, so as to impart to the resulting composite an alkaline pH of at least 8. Generally, the Group VIII metal content of the catalyst is in the range of 0.1 to 5.0 weight percent of the support or base. Sufficient alkali or alkaline earth metal compound or compounds are used to neutralize the acid sites of the catalyst composite including the metal and support, to leave the composite alkaline, and to activate the catalyst for the dehydrogenation of steam-diluted alkanes. The optimum amount of each alkali or alkaline earth metal compound or combination of compounds for each supported metal catalyst must be determined experimentally, but usually at least one compound of a metal of Group Ia or Group IIa in an amount in the range of 0.5 to 10 weight percent of the total catalyst is effective. However, sufficient alkaline material must be employed to impart an alkaline pH of at least 8 to the catalyst.

The catalyst systems for paraffin dehydrogenation are employed at temperatures between 750 and 1250° F., preferably between 1000 and 1100° F., at pressures in the range of 0 to 500 p.s.i.g., preferably 0 to 250 p.s.i.g. Steam to hydrocarbon mol ratios of 0.5:1 to 30:1, preferably 2.5:1 to 5:1 are employed. Total space velocity of hydrocarbon and steam is in the range of 100 to 50,000, preferably 500 to 20,000 volumes of gas/volume of catalyst/hr. (32° F., 15 p.s.i.g. absolute pressure). A catalyst system utilizing the spinel compound is the most active of the catalysts. The preferred catalyst comprises platinum deposited on an alkalized zinc aluminate or on a fluorine-containing active alumina base.

The hydrogen oxidation step utilizes any oxidation catalyst known to the industry and operating conditions are selected to effect selective hydrogen oxidation to substantially complete extinction of hydrogen. To illustrate, a molecular sieve support having an oxidizing component deposited in the pores thereof that will admit hydrogen but still not admit the olefins can be utilized. Only sufficient oxygen or oxygen-containing gas (air) is added prior to each of the hydrogen oxidation steps to react with the hydrogen formed in the prior dehydrogenation step. The amount of oxygen added to the effluent from the prior dehydrogenation step should be approximately one half mol per mol of hydrogen formed therein. Control of the flow rate of the oxygen stream (air) to the oxidation step can readily be effected by periodically or continuously sensing by known means the hydrogen concentration in the dehydrogenation effluent and adjusting the oxygen flow accordingly.

Generally, the effluent from the dehydrogenation step is passed to the oxidation step without substantial change in temperature or pressure at the relatively high temperature of the dehydrogenation effluent and the oxidation catalyst should be of relatively low activity to prevent destruction of hydrocarbons. For this purpose, an oxide of nickel or vanadium and/or tungsten deposited on a suitable porous support such as activated alumina or a molecular sieve is a preferred oxidation catalyst. However, a more active oxidation catalyst such as nickel, the platinum-group metals such as platinum and palladium, silver, or copper deposited on a porous support may be utilized but the temperature of the feed to the oxidation step should be reduced to the range of about 400–500° F. It is also within the scope of the invention to use the same catalyst such as chromium oxide in the hydrogen oxidation steps as in the final olefin oxidative dehydrogenation step. Oxidative dehydrogenation catalysts are well known in the art and a number of them are enumerated hereinafter.

In addition to the steam charged with the paraffin feed, it is within the scope of the invention to charge additional steam with the oxygen required for each of the hydrogen oxidation steps and/or with the oxygen required for the olefin dehydrogenation step, such that the desired temperature control is obtained.

Any of the catalysts known in the art for the oxidative dehydrogenation of olefins can be used in the final olefin dehydrogenation step. A preferred catalyst is the tin-phosphorus catalyst described in U.S. Patent 3,320,329, in which operating conditions for this step are also given. Other catalysts include the oxides of tin, calcium, and phosphorus wherein the calcium to tin ratio lies in the range of about 0.1:1 to 5:1; the oxides of tin, boron, and phosphorus in which the boron content is about 1 to 5 weight percent of the composite; lead molybdate in admixture with aluminum tungstate and/or cobalt tungstate; stannic phosphate; the oxides of iron and chromium; the oxides of molybdenum and bismuth; etc.

The temperature maintained in the oxidative dehydrogenation step to which the mono-olefins are fed from the last paraffin dehydrogenation step, when utilizing the oxides of tin and phosphorus lies in the range of about 900 to 1200 F. However, the temperature to be utilized in this step is dependent upon the activity of the particular catalyst selected and will range anywhere from about 800 to 1300° F. The olefin space rate will generally be in the range of 50 to 5000 volumes per volume of catalyst per hour. The oxygen to olefin mol ratio will generally be in the range of 0.1/1 to 3/1, and the steam to olefin mol ratio will generally be in the range of 1/1 to 50/1. The reaction may be carried out at pressures from subatmospheric to super-atmospheric, although pressures near atmospheric are preferred, i.e., 0 to 50 p.s.i.g.

The process of the invention may be carried out in separate reactors arranged in series, each containing the selected catalyst for the particular reaction to be carried out in that step; in a single reactor containing alternate beds of the different catalysts for the various steps in sequence and having provisions for injection of oxygen and (optionally) steam just upstream of each bed of oxidation catalyst and upstream of the olefin oxidative dehydrogenation step; in a series of reactors having a central packed bed of the steam-active paraffin dehydrogenation catalyst using downflow, surrounded by a fluidized bed of oxidation catalyst, using upflow, such that the heat from the oxidation reaction is supplied to the dehydrogenation reaction; or in any other manner known or apparent from the art.

EXAMPLE

The process of our invention is illustrated by charging n-butane to a first dehydrogenation step (Step I), charging the product of that step to a first hydrogen oxidation step (Step II), charging the product of that step to a second butane dehydrogenation step (Step III), charging the product of that step to a second hydrogen oxidation step (Step IV), charging the product of that step to a third butane dehydrogenation step (Step V), and charging the product of that step to a final hydrogen oxidation and butene dehydrogenation step (Step VI). Operating conditions and a material balance for this operation are shown in the table below. It is apparent that an overall yield of butadiene of 66 mol percent is obtained. After a simple compression and flashing operation the product of Step VI has the following composition:

| | Mol percent |
|---|---|
| n-Butane | 7 |
| n-Butenes | 4 |
| Butadiene | 89 |

This material can be readily purified to yield a pure butadiene stream, or can be charged directly to a number of processes, such as to a polymerization process for the production of butadiene polymers or copolymers.

The catalyst used in the paraffin dehydrogenation steps (Steps I, III, and V) is prepared by coprecipitating a zinc oxide-aluminum oxide gel having a mol ratio of 1/1 (i.e., a zinc aluminate) from a mixed zinc nitrate-aluminum nitrate aqueous solution with ammonium hydroxide, allowing the precipitate to age for 1 hour, filtering and wasing the precipitate with deionized water, drying the precipitate under heat lamps, sieving the precipitate to 8–20 mesh (U.S. Sieve), and calcining it in air several hours at 850° F. This material is impregnated with aqueous platinic chloride solution to add 0.56 weight percent platinum based on the zinc aluminate, calcined at 1000° F. in hydrogen, impregnated with aqueous potassium carbonate solution to add 2.0 weight percent potassium carbonate based on the zinc aluminate, and calcined at 1000° F. in hydrogen. Catalyst bed size is the same in Steps I, III, and V, so that butane space velocity decreases, and conversion increases in each successive bed. Although the hydrogen oxidation steps (Steps II and IV) are exothermic, some additional preheating is usually required prior to the endothermic dehydrogenation steps (Steps III and V), and there is a temperature drop (about 50° F.) in these steps.

The catalyst used in the hydrogen oxidation steps (Steps II and IV) is prepared by impregnating a 5A molecular sieve, whose preparation is described in U.S. 2,950,952, with a nickel nitrate solution to deposit about 1 weight percent nickel based on the total weight of the catalyst, drying, and calcining at 1050° F. in air. Deposition of the nickel salt in the pores of the molecular sieve results in a reduction in pore size such that the catalyst-coated pores of the finished catalyst admit hydrogen, but not hydrocarbon. Catalyst bed size is the same in Steps II and IV, and preheating is usually not required.

The catalyst used in the final hydrogen oxidation-butene dehydrogenation step (Step IV) is prepared by precipitating a tin oxide hydrogel from an aqueous stannic chloride solution with ammonium hydroxide, washing, and spray drying to a water content of about 30 weight percent. This material is impregnated with sufficient aqueous phosphoric acid to give final phosphorus, tin, and oxygen contents of about 5, about 69, and about 26 weight percent, respectively, after calcination at 1100° F. in air. Sufficient oxygen is added for both the oxidation of the hydrogen formed in Step V and the oxidative dehydrogenation of the butenes formed in Steps I, III, and V. Additional steam is added prior to this step, and the temperature in the step is controlled by adjusting the temperature of this added steam.

TABLE—MOLS

| | Butane dehydrogenation, Step I | | Hydrogen oxidation, Step II | | Butane dehydrogenation, Step III | | Hydrogen oxidation, Step IV | | Butane dehydrogenation, Step V | | Hydrogen oxidation and butene dehydrogenation, Step VI | |
|---|---|---|---|---|---|---|---|---|---|---|---|---|
| | Feed | Product | Feed | Product | Feed | Product | Feed | Product | Feed | Product | Feed | Product [3] |
| Steam | 400 | 400 | 400 | 438 | 438 | 438 | 438 | 466 | 466 | 466 | 966 | |
| n-$C_4H_{10}$ | 100 | 60 | 60 | 60 | 60 | 26 | 26 | 26 | 26 | 5 | 5 | 5 |
| n-$C_4H_8$ | | 34 | 34 | 34 | 34 | 60 | 60 | 60 | 60 | 72 | 72 | 3 |
| $C_4H_6$ | | 2 | 2 | 2 | 2 | 3 | 3 | 3 | 3 | 4 | 4 | 66 |
| $H_2$ | | 38 | 38 | | | 28 | 28 | | | 14 | 14 | |
| $O_2$ [1] | | | 19 | | | | 14 | | | | 79 | |
| $N_2$ [1] | | | 76 | 76 | 76 | 76 | 132 | 132 | 132 | 132 | 448 | |
| By-products [2] | | 4 | 4 | 4 | 4 | 11 | 11 | 11 | 11 | 19 | 19 | 26 |

| Operating conditions | Step I | Step II | Step III | Step IV | Step V | Step VI |
|---|---|---|---|---|---|---|
| $C_4H_{10}$ sp. vel, v./v./hr. [4] | 2,000 | | 1,200 | | 52 | 100 |
| Steam/$C_4$ ratio, mol | 4/1 | | 4.6/1 | | 5.2/1 | 11.9/1 |
| $O_2$/butene ratio, mol [5] | | | | | | 1/1 |
| Temperature, °F | 1,050 | 1,000 | 1,050 | 1,000 | 1,050 | 1,090 |
| $H_2$ sp. vel, v./v./hr | | 200 | | 150 | | |
| Steam/$H_2$ ratio, mol | | 11/1 | | 16/1 | | |

[1] Added as air.  [2] $C_4$ equivalent.  [3] $H_2O$ and air-free.  [4] $C_4H_8$ in Step VI.  [5] In excess of that required to react with the hydrogen in the feed.

Certain modifications of the invention will become apparent to those skilled in the art and the illustrative details disclosed are not to be construed as imposing unnecessary limitations on the invention.

We claim:

1. A process for dehydrogenating a $C_3$ to $C_7$ aliphatic paraffin hydrocarbon to the corresponding diolefin which comprises the steps of:

(1) dehydrogenating said hydrocarbon in a first dehydrogenation zone in admixture with steam in a steam-hydrocarbon mol ratio in the range of about 0.5:1 to 30:1, in the absence of free $O_2$, under conditions which convert a substantial portion of said hydrocarbon to the corresponding olefin and produce free $H_2$, in contact with a catalyst comprising:

(a) a support of alumina, HF-treated alumina, silica, magnesia, zirconia, alumino-silicates, Group II aluminate spinels, or mixtures thereof, (b) one of a metal or a reducible compound of a metal of nickel, platinum, palladium, ruthenium, iridium, rhodium, osmium, or mixtures thereof, and (c) at least one compound of a metal of Group Ia or Group IIa in an amount in the range of 0.5 to 10 weight percent of said catalyst sufficient to impart to said catalyst a pH of at least 8;

(2) preferentially oxidizing at least the major portion of said free $H_2$ with $O_2$ by passing the effluent from step (1) in admixture with added free $O_2$ into a first oxidation zone in contact with an oxidation catalyst;

(3) dehydrogenating remaining paraffin hydrocarbon in the effluent from step (2) in a second dehydrogenation zone substantially in accordance with step (1);

(4) passing the effluent from step (3) to a second hydrogen oxidation step wherein hydrogen released in step (3) is oxidized, (5) passing the effluent from step (4) to a third dehydrogenation step wherein remaining paraffin hydrocarbon is dehydrogenated substantially in accordance with step (1); and (6) passing the effluent from step (5) containing monoolefin and $H_2$ formed in the previous steps, in admixture with added $O_2$, into an oxidative dehydrogenation zone in contact with an oxidative dehydrogenation catalyst under conditions which convert said $H_2$ to water and said mono-olefin to diolefin.

2. The process of claim 1 wherein said oxidative dehydrogenation catalyst of step (5) comprises essentially the oxides of tin and phosphorus.

3. The process of claim 1 wherein component (a) in step (1) is a Group II aluminate spinel.

4. The process of claim 1 wherein component (a) of step (1) comprises a zinc aluminate spinel, component (b) of step (1) comprises Pt, and component (c) of step (1) is potassium carbonate.

5. The process of claim 4 wherein said oxidation catalyst of step (2) comprises Pt, Pd, Ag, Cu, nickel oxide, chromium oxide, vanadium oxide, or tungsten oxide deposited on a porous support.

6. The process of claim 4 wherein said oxidation catalyst of step (2) is nickel oxide on a molecular sieve support.

7. The process of claim 1 wherein the effluent from step (3) is passed to additional hydrogen oxidation steps substantially in accordance with step (2) and additional dehydrogenation steps substantially in accordance with step (1) alternately until the paraffin content of the feed to step (5) is equal to or less than 5 mol percent.

References Cited

UNITED STATES PATENTS

| | | | |
|---|---|---|---|
| 2,362,196 | 11/1944 | Frey | 260—683.3 |
| 3,161,670 | 12/1964 | Adams et al. | 260—680 X |
| 3,168,587 | 2/1965 | Michaels et al. | 260—683.3 |
| 3,308,181 | 3/1967 | Pitzer | 260—680 |

PAUL M. COUGHLAN, Jr., Primary Examiner

U.S. Cl. X.R.

260—683.3